United States Patent [19]

Finnegan

[11] Patent Number: 4,813,148

[45] Date of Patent: Mar. 21, 1989

[54] INSTRUMENT FOR AIDING IN PROPERTY SHOEING A HORSE

[76] Inventor: Danny E. Finnegan, 6840 Hickory Ave., Orangevale, Calif. 95662

[21] Appl. No.: 189,792

[22] Filed: May 3, 1988

[51] Int. Cl.$^4$ ............................................. A01L 11/00
[52] U.S. Cl. ...................................................... 33/195
[58] Field of Search ........................................ 33/195

[56] References Cited

U.S. PATENT DOCUMENTS 583,706 6/1897 Kearns ................................. 33/195
4,214,370 7/1980 Beaston ............................... 33/195

*Primary Examiner*—Harry N. Haroian
*Attorney, Agent, or Firm*—Donald E. Nist

[57] ABSTRACT

The instrument includes first and second parallel bars interconnected by a post perpendicular thereto. The first bar is adapted to be placed against the underside of a horse's hoof while the second bar is placed against the rear of the first joint of the foot adjacent the hoof. In this position the second bar is about perpendicular to the post. The second bar bears a heel brace in the form of a flat plate which projects rearwardly therefrom at an angle of about 27° to the perpendicular line from the second bar. A screw and fitting releasably connect the first bar to the post and the second bar is hinged to one end of the post for rotation therearound while maintaining its parallel position with the first bar. The heel brace bears against the intersection of the hoof and first joint at the rear thereof when the instrument is in place, and cooperates with the second bar in preventing slippage of the instrument during measuring of the hoof. The first bar is set at a tilted angle of about 60° from the main plane of the post for better viewing during measuring. The second bar has a centered notch to bracket the first joint of the foot and the heel brace is aligned therewith so that when these two are centered on the first joint and hoof heel, respectively, the post is aligned along the length of the hoof for easy viewing of hoof symmetry.

9 Claims, 1 Drawing Sheet

U.S. Patent        Mar. 21, 1989        4,813,148
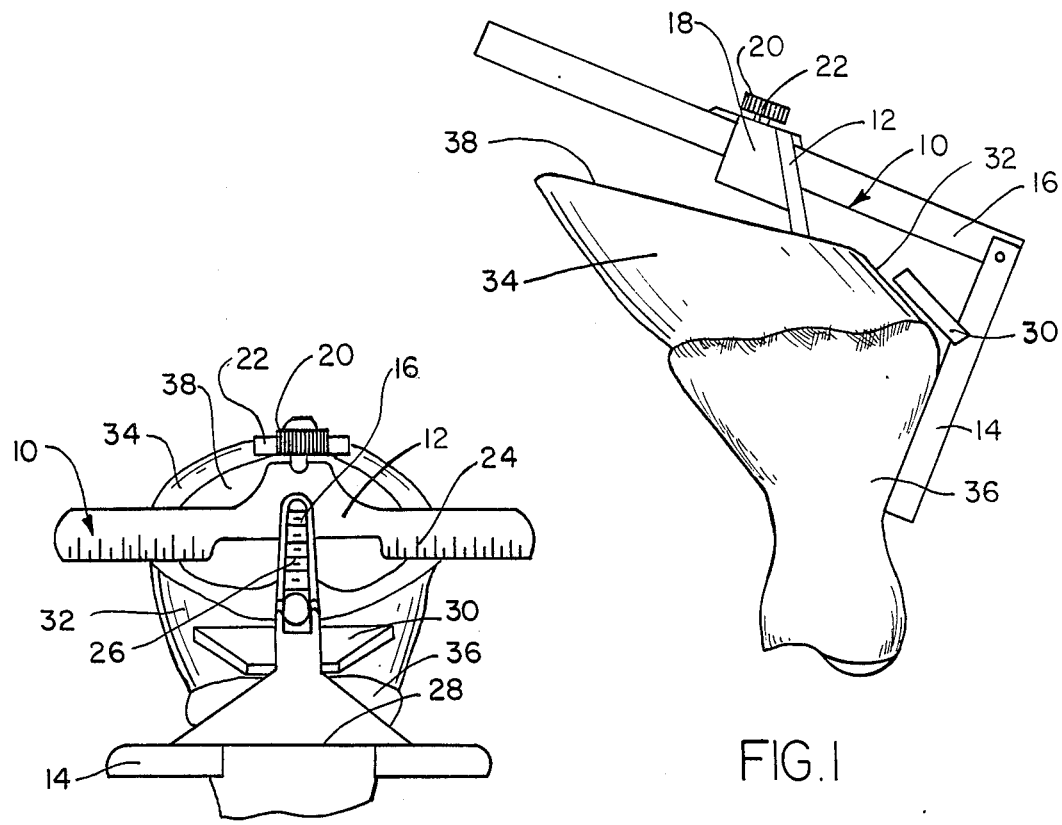
FIG.1
FIG.2
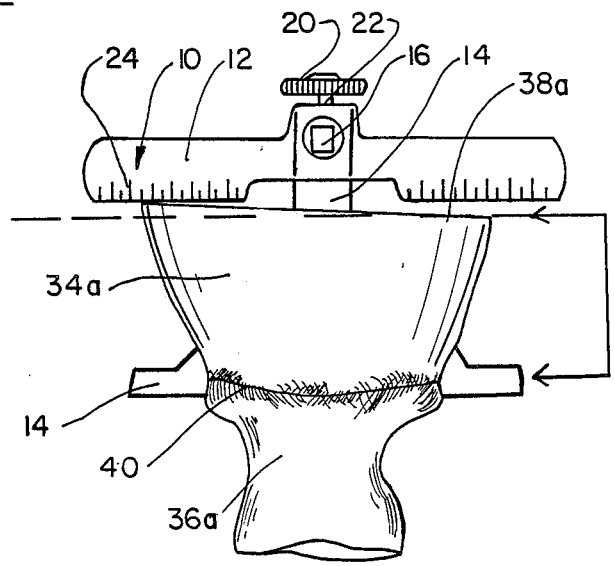
FIG.3

INSTRUMENT FOR AIDING IN PROPERTY SHOEING A HORSE

BACKGROUND OF THE INVENTION

1. Field of the Invention

The present invention generally relates to tools and more particularly to an improved instrument for aiding in properly shoeing a horse or similar shoeable hooved animal.

2. Prior Art

Horseshoeing is considered an art rather than a science, since traditionally, the bottom of a horse's foot is merely eyeballed by the horseshoer in order to determine how flat it is and in what plane, after which the horseshoer makes any corrections by peeling, cutting, filing or otherwise removing part of the bottom of the hoof before mailing the horseshoe in place against the corrected bottom of the hoof. However, errors are frequent and can lead to premature wear of the horseshoe and damage to the horse's leg and foot. The horse's feet and legs can become offset, rotated, deviated, crooked and the like and put unnecessary strain on bone, tendons, ligaments and the like, causing the horse to go lame.

In some instances it is desirable to be able to precisely measure angles between the horse's leg and hoof for special work to which the horse will be later subjected or for remedial purposes. None of this can be done with any degree of precision with commercially available tools.

Applicant in U.S. Ser. No. 168,911, copending herewith, for the first time describes and claims an improved instrument which effectively measures hoof and foot angles. There remains a need, however, for and instrument of even greater precision, accuracy and flexibility which will permit measurement of the symmetry, slope and other physical features of the horse's foot at a glance and with improved reproducibility. Such device should assure rapid and precise alignement of its components and non-slip usage. The device should be simple and easy to use and to make, and should be durable and accurate.

SUMMARY OF THE INVENTION

The improved instrument of the present invention satisfies all the foregoing needs. The instrument is substantially as set for in the Abstract of the Disclosure. In this regard, the instrument includes a pair of parallel spaced bars supported on a post perpendicular thereto. The post is releasably connected to the first of the two bars through a screw and fitting arrangement or the like which allows for varying the spacing between the bars to fit hooves of various sizes. The second bar is hinged to one end of the post so that it can rotate therearound while remaining parallel to the first bar. The second bar bears a heel brace which projects rearwardly therefrom at an angle of preferably about 27° from the perpendicular. The heel brace is a flat plate adapted to bear against the heel portion of the hoof when the second bar is against the heel portion of the horse's first joint adjacent the hoof. Both cooperate to brace the instrument against slippage. When the second bar and heel brace are in the described positions, the first bar can be against the bottom the the hoof, with the post forming a right angle with the second bar. Preferably, the first bar is a flat plate tilted at an angle of about 60° to the main plane of the post.

The second bar is also a flat plate bearing a centrally aligned notch adapted to bracket the horse's first joint when in the above-described position. The heel brace is centrally aligned with the notch. The post extends down the center of the hoof along the length thereof when the notch and heel brace are centrally aligned against the first joint and hoof heel, respectively. When the instrument is in this position, symmetry of the hoof can be determined in a glance, as well as the length and width of the hoof, since the post and first bar bear linear indicia. The tilt of the hoof can also be read easily.

Further features of the present invention are set forth in the following description and the accompanying drawings.

DRAWINGS

FIG. 1 is a schematic side elevation of a preferred embodiment of the improved instrument of the present invention in place on the hoof and against the heel of a horse's foot;

FIG. 2 is a schematic rear perspective view of the instrument of FIG. 1 in place on the hoof of FIG. 1; and, FIG. 3 is a schematic side elevation of the instrument of FIG. 1 in place against another horse's hoof, with the second blade thereof parallel tothe intersection of the hoof and first joint, for measurement of the extent to which the hoof approaches a parallel condition with the intersection.

DETAILED DESCRIPTION

FIGS. 1-3

Now referring to FIGS. 1-3 of the accompanying drawings, a preferred embodiment of the improved instrument of the present invention is schematically shown therein. This, instrument 10 is shown, which comprises a first bar 12 and a second bar 14; parallel to each other and supported on a post 16 perpendicular thereto. In this regard, bar 12 is releasably secured to post 16 by a fitting 18 connected to bar 12, down through which extends a screw 20 with turn wings 22. Screw 20 intercepts post 16 which passes through bar 12 and fitting 18. With this arrangement, bar 12 can be moved to any location along the length of post 16 and can be then pinned in place with screw 20.

Bar 12 is notched in the center and bears linear indicia in the form of equally spaced marks 24 on the two sides of the notched area. Similarly, post 16 bears linear indicia along the length thereof in the form of equally spaced marks 26. Bar 12 is in the form of a flat plate tilted preferably at an angle of about 60° from the main plane of post 16 to facilitate easier viewing of angles when instrument 10 is in a measuring position such as is shown in FIGS. 1 and 2.

Bar 14 is a flat plate which is hinged to one end of post 16, as shown. The center of the free end of bar 14 bears a notch 28 for bracketing and viewing the first joint of a horse (FIG. 2) when instrument is in the position shown in FIGS. 1 and 2.

Bar 14 bears a heel brace in the form of a flat plate 30 which projects rearwardly from bar 14 at an angle of preferably about 27° from a line perpendicular to bar 14. When instrument 10 is in the position shown in FIGS. 1 and 2, brace 30 abuts the heel 32 of hoof 34, while bar 14 extends against the heel portion of the first joint 36, adjacent hoof 34. Brace 30 and bar 14 cooperate to hold instrument 10 steady against slippage during measuring carried out therewith. It will be noted that when bar 14 and brace 30 are in the described positions, post 16 is perpendicular to bar 14, or approximately so, and bar 12 bears against the underside 38 of hoof 34. Moreover, if notch 28 is first centered on joint 36, as shown in FIG. 2, and brace 30 is similarly centered on heel 32, post 16 will automatically extend down the longitudinal centerline of hoof 34 for the length thereof. The length, width and symmetry of hoof 34 will then be immediately apparent, as well as the tilt and slope thereof. Accordingly, instrument 10 will provide precise measurements easily, rapidly and simply by applying it to hoof 34 as shown in FIGS. 1 and 2.

Instrument 10 can also be used in the manner illustrated in FIG. 3 to assure that hoof 34a can be trimmed to make it parallel to the intersection 40 of the hoof 34a and first joint 36a specifically the termination of the hairline at intersection 40. This measurement can be made by placing bar 12 against undesired 38a then rotating bar 14 until it is against intersection 40. Instrument 10 is then filted until bar 14 is parallel to intersection 40 and the gap, if any, between parallel bar 12 and underside 38a is noted, as shown in FIG. 3. Trimming of underside 38a can then take place until it is level with intersection 40, that is, parallel thereto and therefore properly flat and suitable for mounting a horseshoe thereon. This measurement is simple and easy, with bar 14 being easy to rotate into a position. It will be understood that other measurements can be made using instrument 10, all of which measurements can be carried rapidly and with reproducible precision. In FIG. 3, the "a" designations indicate a second horse's foot and hoof with which instrument 10 is used.

Instrument 10 and its components can be fabricated of metal, plastic, ceramic, wood and combinations thereof in a simple inexpensive manner. Various other features and advantages of instrument 10 are set forth in the foregoing.

Other modifications, changes, alterations and additions can be made in the improved instrument of the present invention, its components and parameters. All such changes, modifications, alterations and additions as are within the scope of the appended claims form part of the present invention.

What is claimed is:

1. An improved instrument for aiding in the shoeing of horses and other hooved animals, said instrument comprising, in combination:
   (a) first and second parallel bars, said first bar being adapted to be placed on the underside of a horse's hoof and said second bar being adapted to be placed against the rear of the first joint of the horse's foot adjacent the hoof thereof;
   (b) a post interconnecting said bars, generally perpendicular thereof and maintaining said bars generally parallel to each other for adjusting the spacing between said bars to accommodate hooves of various dimensions; and,
   (c) means releasably connected to said first bar and to said post for effecting said spacing adjustment; said second bar being pivotably connected to one end of said post for rotation therearound while maintaining its parallel position with said first bar, said second bar bearing a heel brace extending from the rear of said second bar at an angle thereto and adapted to bear against the intersection of the heel portion of a horse's hoof and the heel portion of the first joint of the horse's foot and to cooperate with said second bar to prevent slippage of said instrument during measuring with said instrument.

2. The improved instrument of claim 1 wherein said heel brace is a flat plate set at an angle of about 27° from a line perpendicular to said second bar.

3. The improved instrument of claim 1 wherein said first bar is a flat plate tilted forward at an angle of about 60° from the main plane of said post for better viewing of hoof angles.

4. The improved instrument of claim 1 wherein said second bar is disposed against the heel of the first joint of a horse's foot adjacent the hoof thereof said second bar is at an angle of about 90° to said post.

5. The improved instrument of claim 1 wherein the free end of said second bar is notched fo bracketing the first joint of a horse's foot.

6. The improved instrument of claim 5 wherein said notch is centered along the length of said second bar and wherein said heel brace is centered relative to said notch whereby when said notch is centered on the first joint of a horse's foot and said heel brace is centered on the rear of the horse's hoof, said post is automatically aligned along the longitudinal centerline of said hoof for ready determination of hoof symmetry, balance and other factors.

7. The improved instrument of claim 6 wherein said first bar bears lineal measurement indicia along the length thereof.

8. The improved instrument of claim 7 wherein said post bears lineal measurement indicia along the length thereof.

9. The improved instrument of claim 1 wherein said releasable interconnecting means comprises a threaded screw intercepting said post and said first bar to releasably pin them together.

* * * * *